Dec. 25, 1962 B. WOODWARD, JR 3,070,210
PARTS ELEVATOR FEEDER AND SELECTOR MACHINE
Filed Oct. 12, 1959 4 Sheets-Sheet 1

INVENTOR.
BERNARD WOODWARD, JR.
BY
ATTORNEYS

Dec. 25, 1962 B. WOODWARD, JR 3,070,210
PARTS ELEVATOR FEEDER AND SELECTOR MACHINE
Filed Oct. 12, 1959 4 Sheets-Sheet 2

Dec. 25, 1962   B. WOODWARD, JR   3,070,210
PARTS ELEVATOR FEEDER AND SELECTOR MACHINE
Filed Oct. 12, 1959   4 Sheets-Sheet 3
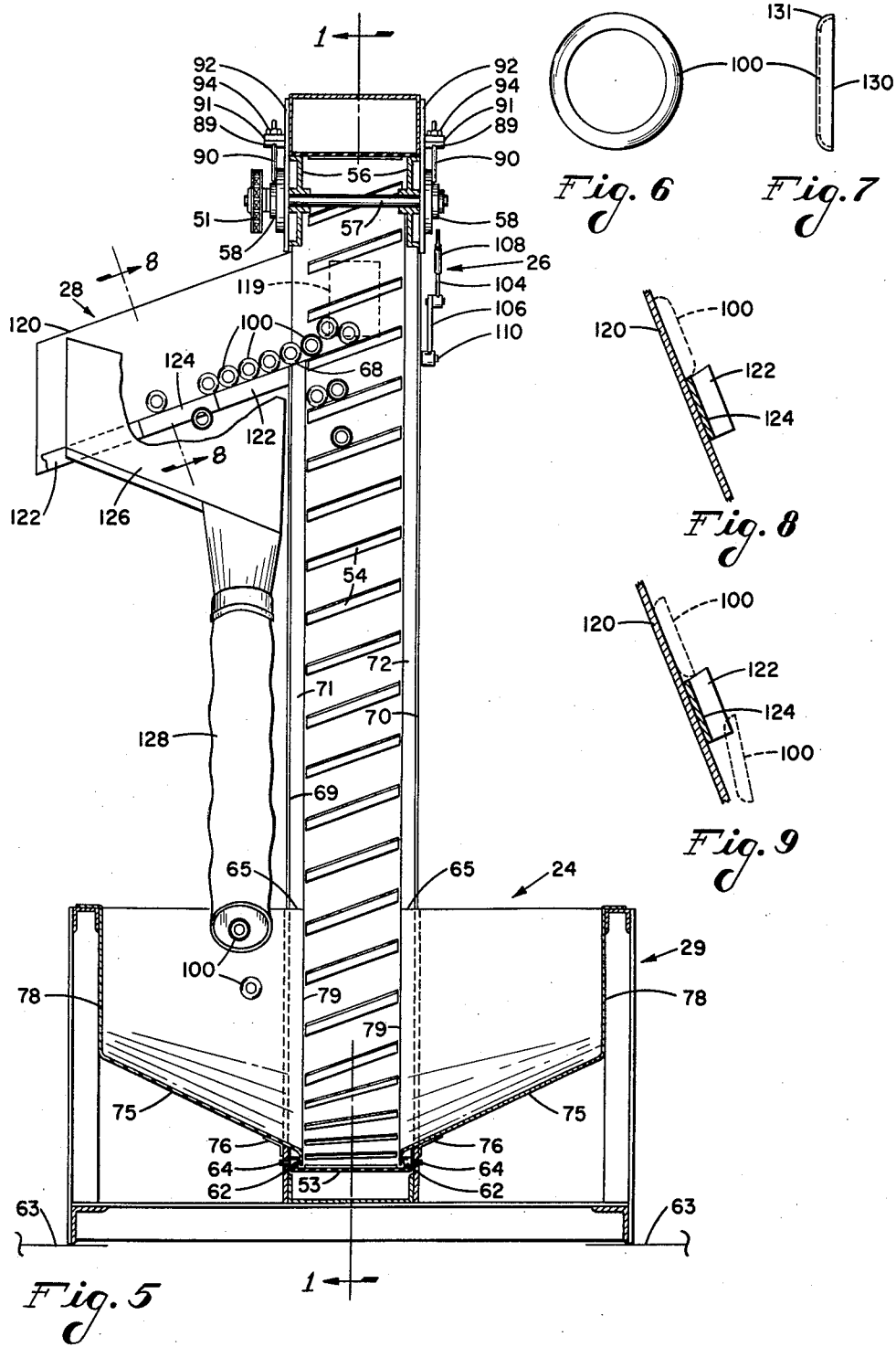

Dec. 25, 1962  B. WOODWARD, JR  3,070,210
PARTS ELEVATOR FEEDER AND SELECTOR MACHINE
Filed Oct. 12, 1959  4 Sheets-Sheet 4

United States Patent Office 3,070,210
Patented Dec. 25, 1962

3,070,210
PARTS ELEVATOR FEEDER AND
SELECTOR MACHINE
Bernard Woodward, Jr., Rochester, N.Y., assignor of one-half to Augustus W. Griswold, Rochester, N.Y.
Filed Oct. 12, 1959, Ser. No. 845,700
11 Claims. (Cl. 198—33)

My invention relates to feeding machines and more particularly to a parts feeding and selecting machine.

While the machine of my invention may be employed as a feeding machine for elevating parts to a higher level to start the parts through an assembly line or convey them to a place of further processing, it has been primarily designed to convey and orient them so that all the parts face in the same direction. For example, many parts used in many machines and devices are not symmetrical, that is, one circular edge of a substantially cylindrical part may be sharp while the other circular edge may have a flange or a planar face. In most assembly operations, it is more convenient and facilitates production if the parts are presented to the assembler all facing in the same direction. If the parts are to be further machined or subjected to further processing, it is sometimes imperative that the same face of each and every part extend in the same direction.

While the machine of my invention has been primarily designed for handling parts that will roll, it is adaptable, as will be apparent to anyone skilled in the art, to handling noncircular parts or objects.

The art of mechanical elevating feeders, as heretofore practiced, utilized a stationary hopper and a conveyor belt, most commonly not flexible, extending vertical or upwardly at an acute angle with respect to the hopper or floor. The conveyor belts have in the past had a plurality of buckets or cleats on the exterior surface for picking up the materials to be conveyed. The bottom of the belt usually entered the hopper at the lower extremity of said hopper through a hole cut in the hopper. The buckets or cleats on such machines passed by or through the quantity of articles to be conveyed and dug or clawed at said articles in order to lift them onto the conveying belt.

My invention obviates this digging or clawing process and substitutes therefore a satisfactory method of picking up the articles by gently rolling or tumbling them over the interior surface of the conveying belt. My invention consists of a belt and conveying elements on the interior surface of the belt which interior surface passes under the articles and picks up those which are properly oriented from top to bottom as shown in FIG. 5 as it rolls and tumbles the mass of articles on said belt. The belt itself constitutes the bottom of the hopper.

One of the objects of my invention is to provide a considerably less expensive gravity elevating feeder.

Another object of my invention is to provide a mechanism which is easily adjustable to handle a wide range of items to be conveyed.

One further object of my invention is to provide a machine which will not produce the undesirable characteristic of digging or clawing at the articles to be conveyed in order to lift them on the conveying elements, the digging or clawing sometimes marring or nicking articles or parts which already have a finished surface on them.

Another object of my invention is to provide a gravity elevating feeder mechanism which will completely eliminate any possibility of the articles escaping out of the bottom part of the hopper where, according to the old teachings, the belt entered the hopper.

Thus, it is my further object to provide a more efficient means of elevating articles.

Still another object of my invention is to provide a vibrating mechanism for vibrating the articles at the point where they are discharged from the belt in order to facilitate the ease with which said discharge may be accomplished.

My invention further contemplates the combination of an elevator feeder mechanism and a means for selecting articles properly oriented from front to back being conveyed and returning improperly oriented articles to the hopper for reconveyance, reorientation and reselection.

Other objects and advantages of my invention will be particularly set forth in the claims and will be apparent from the following description of one embodiment of my invention, when taken in connection with the accompanying drawings, in which:

FIG. 5 is an end elevation with parts broken away to more clearly illustrate this embodiment;

FIGS. 6 and 7 are side and end elevations respectively of a selected article which may be conveyed, elevated, oriented and selected by the embodiments of my invention presented here;

Figure 10:
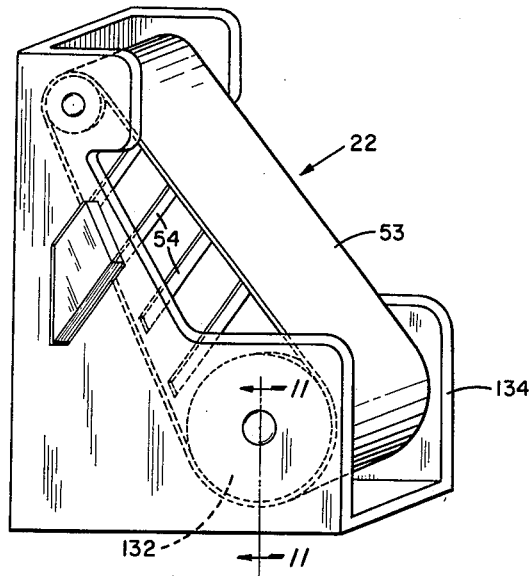
Figure 11:
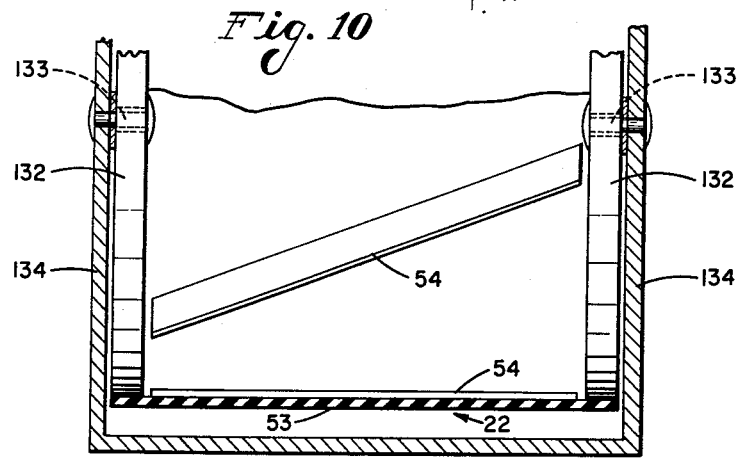
Figure 12:
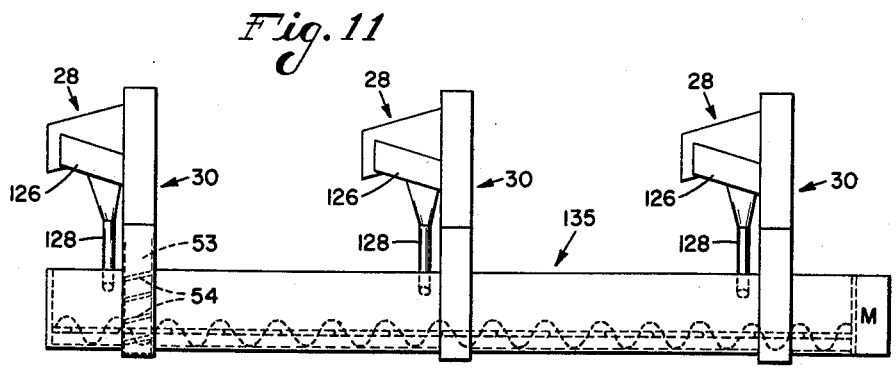

FIGS. 8 and 9 are sectional views taken substantially on the line 8—8 of FIG. 5 looking in the direction indicated by the arrows and showing the articles illustrated in FIG. 6 and FIG. 7; FIG. 8 showing a properly oriented article advancing over the selector means and FIG. 9 showing two improperly oriented articles passing over the gathering rail 122 and falling off of the selector rail 124;

FIG. 10 is a perspective view of a second embodiment of my invention;

FIG. 11 is a sectional view taken substantially on line 11—11, FIG. 10, looking in the direction indicated by the arrows; and FIG. 12 is an end elevation of a plurality of the parts elevator feeder and selector machine in combination with a helical conveyor type hopper.

Figure 1:
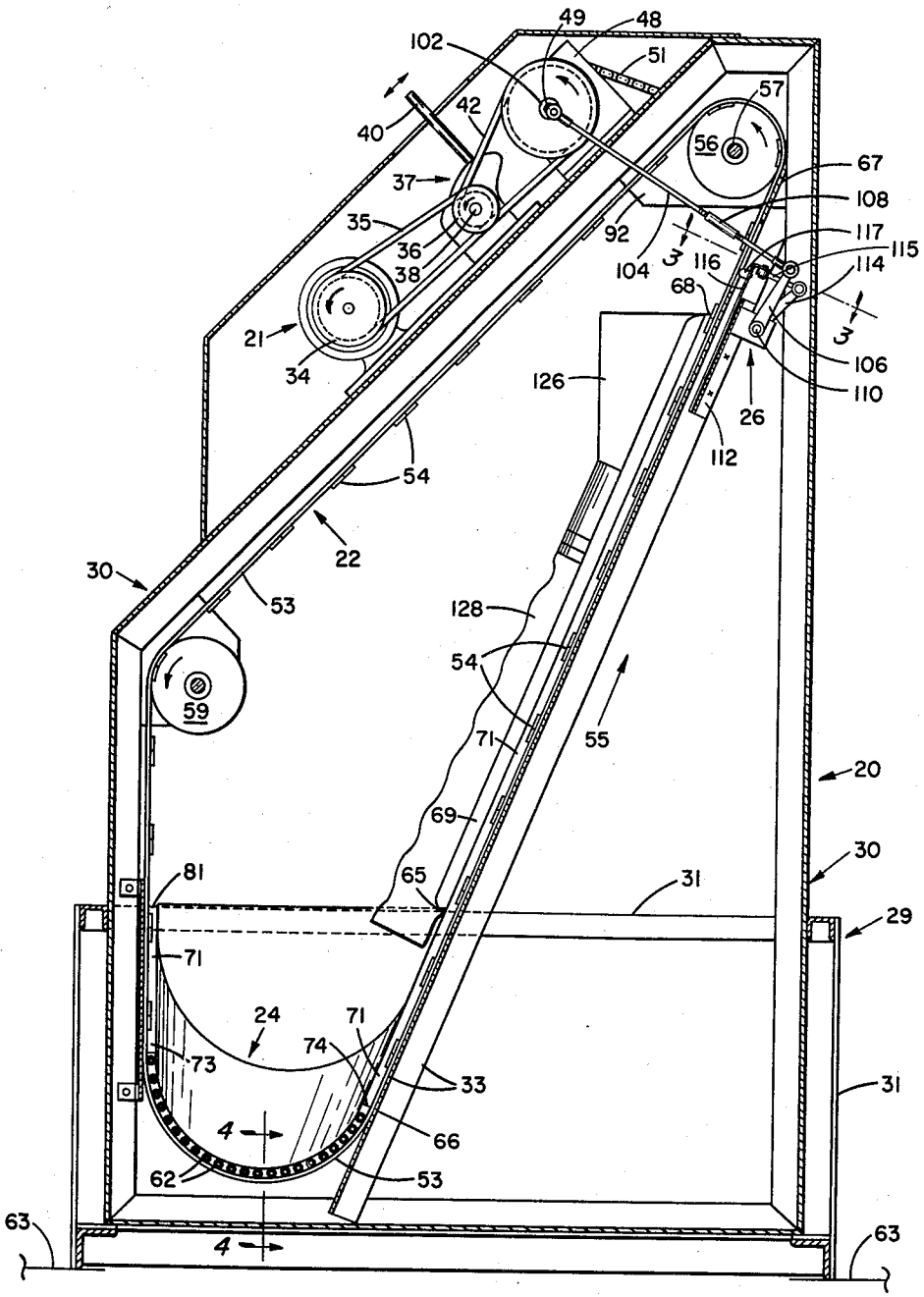
FIG. 1 is a side elevation in cross-section taken substantially on the line 1—1 of FIG. 5 looking in the direction indicated by the arrows.

Referring to FIG. 1, this embodiment of my invention comprises a frame, generally indicated by the numeral 20, a power source, generally indicated by the numeral 21, a belt, generally indicated by the numeral 22, a hopper, generally indicated by the numeral 24, a vibrator means, generally indicated by the numeral 26, and a selector means, generally indicated by the numeral 28 (FIG. 5).

The frame 20 is made up of a hopper support frame generally indicated by the numeral 29 and a structural frame, generally indicated by the numeral 30 for supporting all parts other than the hopper 24.

The frame 29 is made up substantially of right angle steel bars 31 to define a rectangular parallelepipedon which supports hopper 24 and lends support to structural frame 30. Frame 30 supports the belt 22, the power source 21, a belt support 33 of U-shaped cross-section and all other elements of the feeder and selector. The frame 20 may be stationary or mounted on casters so as to make the entire embodiment portable.

The power source 21 is an electric motor rigidly mounted on top of the support 30. The motor drives a pulley 34 in a counter-clockwise direction with respect to FIG. 1. A V-belt 35 passes over pulley 34 and over one side of a double groove pulley 36, which is part of a variable speed V-belt drive, commonly known in the art, and generally indicated by the numeral 37. The double groove pulley 36 is mounted on a shaft 38 which shaft is seated in a bearing (not shown) which is part of said speed drive 37.

The adjustment for varying the speed of the belts engaging the speed drive 37 is accomplished by means of a handle 40 mounted on the variable speed drive. When the handle 40 is moved upwardly or to the right, as viewed in FIG. 1, the speed of a V-belt 42 is increased; movement of handle 40 downwardly or to the left with respect to FIG. 1 results in a corresponding decrease in speed. Belt 42 is driven off of the opposite side of the double groove pulley 36 from the belt 35.

Figure 2:
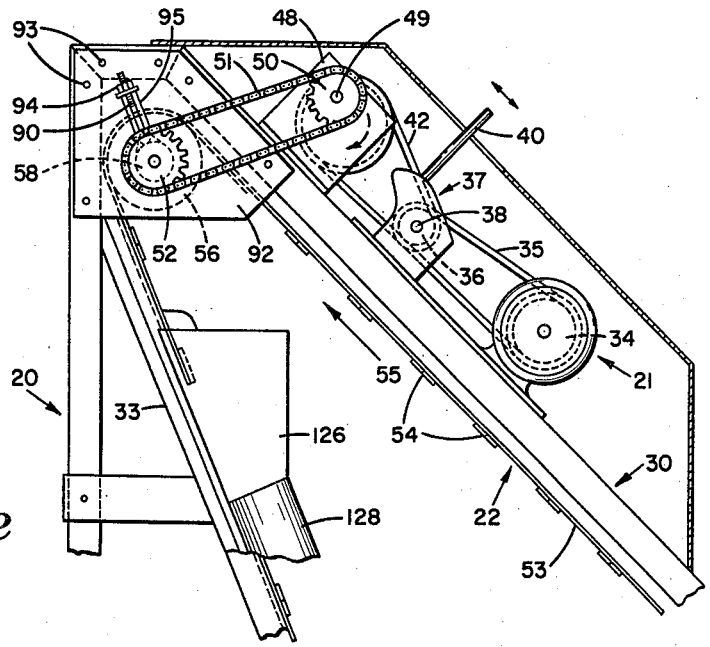
FIG. 2 is a partial side elevation looking at the opposite side from that shown in FIG. 1.

The V-belt 42 drives a pulley 44 rigidly mounted on a shaft (not shown). Said shaft is connected to a gear speed reducer 48, commonly known in the art, whereby the clockwise motion of said shaft and pulley 44 with respect to FIG. 2 is transferred to a shaft 49 by gears (not shown) within the gear speed reducer 48 and the relative speeds between the shaft on which pulley 44 is mounted and shaft 49 are reduced thereby to any desired amount. Shaft 49 drives a sprocket 50. The sprocket 50 drives a larger sprocket 52 by means of a roller link chain 51. The direction of rotation made by pulleys 34, 36, 44 and sprockets 50 and 52 are all indicated by arrows drawn thereon.

Referring to FIG. 1 and FIG. 2, the belt 22 consists of an endless flexible strip of material 53, preferably rubber, with flexible straps or cleats 54 molded or affixed onto the strip 53 at a diagonal angle to the direction of travel of belt 22 (FIG. 5); said direction of travel being indicated by arrow 55.

The belt 22 passes over and is driven by a pair of pulleys 56 mounted at the top thereof. The pulleys 56 are rigidly mounted on a shaft 57 and spaced so that pulleys 56 engage the outer extremities of each side of belt 22 and allow the cleats 54 to pass freely between said pulleys (FIG. 5). Shaft 57 is seated and supported by two ball bearings 58 (FIG. 5) and rigidly connected to sprocket 52 and driven thereby. Referring to FIGS. 2 and 5, each ball bearing 58 is rigidly connected to an adjustable support rod 90 which passes transversely through a hole 89 in an extension 91 of a support plate 92 which is rigidly connected to frame 30 by bolts 93. A nut 94 threaded on rod 90 engages extension 91 and holds pulleys 56 in position. When nuts 94 are threaded downwardly on rod 90, pulleys 56 are adjusted upwardly and belt 22 is drawn more tautly; a reverse adjustment of said nuts loosens belt 22. As the above described adjustment is made, shaft 57 travels in a slot 95 (FIG. 2) cut in support plate 92.

Referring to FIG. 1, the belt 22 also passes over two idler pulleys 59. The pulleys 59 are spaced so as to engage the outer extremity of both sides of the belt 22 and allow the cleats 54 to pass freely between the same.

Figure 4:
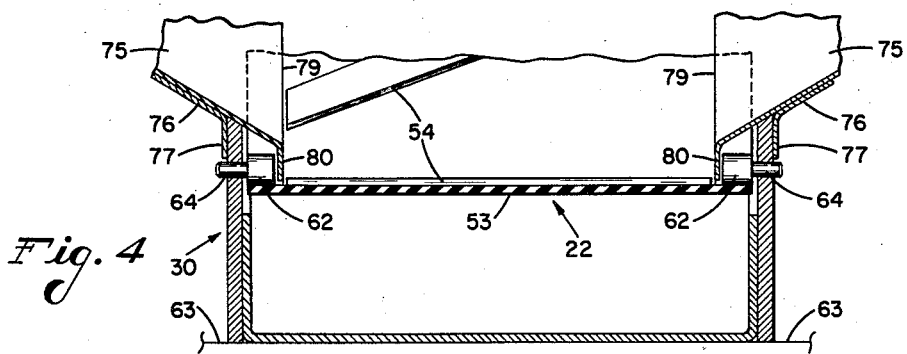
FIG. 4 is a sectional view taken substantially on line 4—4 of FIG. 1 looking in the direction indicated by the arrows.

At the bottom of the belt, both sides thereof are engaged by a plurality of rollers 62 each of which is rotatably mounted in the support 30 at 64 (FIG. 4). The rollers 62 describe a semicircle on each side of the belt forming the bottom of the hopper 24. The surface tension of belt 22 supported by rollers 62 is sufficient to maintain the belt at substantially a perpendicular position with respect to rollers 62, enabling said belt to perform the function of a hopper as well as a conveying means. After passing under the rollers 62, the belt 22 is transported upwardly to the right as viewed in FIG. 1 at an acute angle with respect to the hopper 24 and the floor support 63. The back of the belt 22 from 66 to 68, hereinafter referred to as the conveying section of the belt, is supported by a U-shaped support 33 enabling the belt to convey articles or parts 100 without the belt 22 sagging due to the weight of the articles 100. The speed of the belt 22 may be varied by the variable speed V-belt drive 37 as described above.

Figure 3:
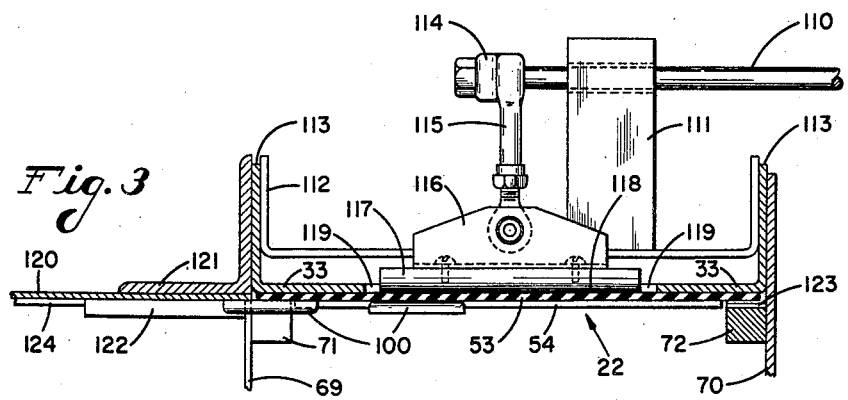
FIG. 3 is a cross-sectional view taken substantially on a line 3—3 of FIG. 1, looking in the direction indicated by the arrows.

In operation, the articles in the hopper 24 are gently tumbled and rolled by the belt 22 as it passes under the articles and the articles which are properly oriented from top to bottom, as illustrated in FIG. 5, are picked up and elevated by the cleats 54 from 66 to 68 (FIG. 5). To a large extent, belt 22 is aligned by means of the two pairs of pulleys 56 and 59 and by the plurality of rollers 62 engaging the outer extremities of the belt. However, there are several other elements of this embodiment contributing to the alignment of said belt. Referring to FIG. 5, two sidewalls 69 and 70, extending from substantially the top 65 of the hopper to 68 and 67 respectively, are rigidly connected to the support 33 on the left and right hand sides respectively thereof as viewed in FIG. 5 and tend to align said belt within the bounds of said sidewalls by supporting a portion of two filler bars 71 and 72, of square cross-section (FIG. 3). Referring to FIG. 1, said portions of said filler bars extend from 74 upwardly to 68 and 67 respectively and are secured to the said sidewalls. The filler bars 71 and 72 are so connected to the sidewalls 69 and 70 as to permit the belt 22 to pass thereunder and the cleats 54 to pass freely between the same. As the articles being conveyed pass off of belt 22, they first roll over filler bar 71 at 68 (FIG. 5). Also, contributing to the alignment of the belt are two portions of filler bars 71 and 72 extending from the top of the hopper at 81 downwardly to 73 and secured to support 33.

Referring to FIGS. 1, 4 and 5, the bottom and central portion of the hopper 24 is described by the contour of the belt passing under the plurality of rollers 62 formed in substantially a semi-circle (FIG. 1). The sidewalls of the hopper 24 comprise two conical-shaped bins 75 rigidly affixed to frame 30 by a plurality of angle irons 76 (FIG. 4) welded to said bins and to the support 30 at 77. The bins 75 of the hopper are closed at the ends 78 (FIG. 5) and open at the ends which are presented to the sides of belt 22. The closed ends of said bins are supported by frame 29. The open ends 79 of the bins have a flange 80 (FIG. 5) covering the rollers 62 on each side of the belt to prevent any of the articles from engaging the rollers 62. The flanges 80 fit between the rollers 62 and the diagonal cleats 54 and contribute to the alignment of that portion of the belt 22 constituting the bottom of the hopper.

Referring to FIG. 5, the properly oriented articles being conveyed on the diagonal cleats 54 are carried upward to 68 at which point they are vibrated by the vibrator means 26 and are discharged at the top end of sidewall 69 terminating at 68. The articles or parts 100 pass over the filler bar 71 as they are discharged. The articles then pass on to the selector means 28. If the articles are of circular configuration, such as those shown in FIGS. 5, 6, 7, 8 and 9, said articles will roll off of cleats 54 onto the selector means 28 when vibrated by the vibrator means 26. If the articles being conveyed are polygonal in configuration, they will slide off the diagonal cleats 54 when urged by the vibrator means 26. Of course, the diagonal angle at which the cleats 54 are placed on belt 22 facilitates the rolling or sliding of the articles 100 as they reach the top of the filler bar 71 at the position 68.

Referring to FIG. 1, the vibrator means 26 is activated by an eccentric 102 rotated by the shaft on which pulley 44 is mounted. A rod 104 connected to the eccentric 102 is in turn connected to and activates a rocker arm 106. The length of the rod 104 is adjustable by means of a turnbuckle 108. An adjustment of the turnbuckle 108 will increase or decrease the amplitude of vibration exerted on the belt 22 by the vibrator means 26. The rocker arm 106 is rigidly mounted on a shaft 110.

Now, referring to FIG. 3, the shaft 110 passes through a bearing 111 rigidly mounted on a U-shaped support 112 which in turn is welded on both sides at 113 to the U-shaped support 33. A vibrator arm 114 is rigidly surmounted on shaft 110; a connecting rod 115 is pivotally connected to the vibrator arm 114 at one end and rigidly connected to a vibrator plate 116, at the other end; said vibrator plate has a resilient pad 117 attached thereon. When the eccentric 102 vibrates the rod 104, the rocker arm 106 vibrates the shaft 110 relaying the vibration to the vibration to the vibrator arm 114 to the connecting rod 115 and to the vibrator plate 116. In turn, the resilient vibrator pad 117 taps or vibrates belt 22 on the exterior surface thereof at 118. It is to be observed that the vibrator pad 117 passes through a slot 119 cut in support 33. The vibration caused by the eccentric 102 results in an alternately clockwise and counter-clockwise movement of the vibrator arm 114 with respect to FIG. 1. The vibrator means 26 taps the belt 22 above the end 68 to filler bar 71; therefore, vibration of the belt above that point is obstructed on the left hand side of the belt with respect to FIG. 3. In order to provide unobstructed vibration on the right hand side of belt 22 as viewed in FIG. 3, there is a recess 123 cut in filler bar 72; said recess is cut longitudinally in filler bar 72 and extends from a point (not shown) substantially corresponding to 63 on filler bar 71 upward to substantially the end 67 (FIG. 1) of filler bar 72.

Referring to FIGS. 3 and 5, after the articles 100 pass off of the cleats 54 and have passed over the end 68 of filler bar 71, said articles pass on to the selector means 28. The selector means comprises a back support 120, a right angle bar 121, a gathering rail 122, a selector rail 124, a hopper 126 and a chute 128. The back support 120 is rigidly connected to the right angle bar 121 which in turn is rigidly connected to support 33. The gathering rail 122 and selector rail 124 are both rigidly connected to said back support. All articles 100 discharged at 68 roll over the gathering rail 122. Gathering rail 122 is of a width equal to or larger than the width of the articles 100. The back support 120 and rails 122 and 124 are rigidly connected to support 33 diagonally so parts 100 will be conveyed thereon.

Referring to FIG. 7, the article being selected by selector means 28 whether it be round in shape, such as depicted in FIGS. 6 and 7, or of polygonal configuration, it must have a sharp edge 130 and a rounded or beveled edge 131.

Referring to FIG. 5, for a front elevation and to FIGS. 8 and 9 for end elevations, after the article 100 has passed over the gathering rail 122, the article travels over selector rail 124 which is only of sufficient width to support those articles 100 which are oriented from front to back with the sharp edge 130 engaging the back support 120; articles being so oriented will hereinafter be referred to as articles being properly oriented from front to back. The selector rail 124 is not sufficiently wide to support improperly oriented articles, that is, articles which face so the beveled edges thereof engage said rail. The improperly oriented articles will drop off of the selector rail 124, enter the hopper 126, and return by means of chute 128 to hopper 24. After said articles have been returned to hopper 24, they will be picked up and reconveyed on belt 22.

Referring to FIG. 8, article 100 is properly oriented, from front to back and will pass over the selector rail 124 and thereafter it will be carried by conveying means (not shown) to a point for further processing. Referring to FIG. 9, 100 is an improperly oriented article passing over the gathering rail 122 which is of sufficient width to support the same; article 100 has fallen off of the selector rail 124 which is not of sufficient width to retain such an article improperly oriented from front to back.

Referring to FIGS. 10 and 11, I have portrayed a second belt 22 (numerals of belt correspond to belt numbers in FIG. 4) and two pulleys 132. Pulleys 132 are each rotatably mounted on a support pin 133 which in turn is rigidly connected to and are supported by a frame 134. Said pulleys are so spaced as to engage the outer extremities of belt 22 and permit cleats 54 to pass between said pulleys. Said pulleys are idlers and serve as the sidewalls of the hopper as well as aligning means for belt 22. The surface tension of belt 22 supported by pulleys 132 is sufficient to maintain the belt at substantially a perpendicular position with respect to pulleys 132, enabling said belt to perform the function of a hopper as well as conveying means. A spout in which articles are conveyed directly from an assembly line could be directed into the hopper described by pulleys 132 and the belt 22 in FIG. 10.

FIG. 12 discloses a third variation or combination of my invention. Said variation comprises a plurality of the parts elevator feeder and selector machine shown in FIG. 1, except that there is a helical conveyor generally indicated by the numeral 135 substituted for the bins 75. Helical conveyors are old per se and are well known in the art, but this combination is unique. Referring to FIG. 12, numbers appearing thereon are identical to corresponding parts shown in FIG. 1. All three embodiments shown in FIGS. 1, 10 and 12 are subject to modifications such as the placing of the hopper means below floor or ground level facilitating the filling of the hopper means.

In summarizing the main operation of the portrayed embodiments of my invention, I refer you to FIG. 5. Articles 100 are conveyed to hopper 24 where in due course they are picked up by the cleats 54 and conveyed upwardly on the belt 22 to 68. A combination of gravity, the angle of cleat 54 and a vibrating force acting on belt 22, discharges articles 100 at 68 on to a gathering rail 122. After said articles have been conveyed over the gathering rail, they engage a selector rail 124. Properly oriented articles are conveyed over the selector rail and improperly oriented articles fall off of said rail into hopper 126. Said articles are conveyed by chute 128 back to hopper 24 for reconveyance on the cleats 54.

While there has been shown and described the preferred forms of mechanisms of the invention, it will be apparent that various changes and modifications may be made therein, particularly in the form and relation of parts, without departing from the spirit of the invention as set forth in the appended claims.

I claim:
1. A feeder machine for elevating articles comprising in combination, an endless flexible belt having a conveying section, conveying elements on the interior surface of said belt, means for driving the belt, forming means engaging only one surface of the belt at the bottom thereof for forming and maintaining the interior surface of the bottom of the belt as a hopper channeling said articles to the conveying section of the belt, said forming means being free of said conveying elements, and means supporting the belt and driving means.

2. A machine in accordance with claim 1 in which the forming means comprises the inner side walls of two pulleys around which the edges of the interior surface of the bottom of the belt rotates.

3. A feeder machine for elevating articles comprising, in combination, an endless flexible belt having conveying elements on the interior surface thereof, said belt having a conveying section; means for driving the belt; article holding means for holding a quantity of articles to be conveyed on the conveying section of the belt, comprising a bottom portion of the interior surface of the belt which is substantially arcuate in shape and a plurality of rollers engaging the interior surface of the bottom of the belt to maintain the arcuate shape of the belt, and sidewall means channeling the articles onto the interior bottom portion of the belt; means for supporting the belt and driving means; and means for removing the elevated articles from each conveying element in turn as each conveying element reaches a pre-selected point short of the upper end of the belt along a course of elevation.

4. A feeder machine for elevating articles comprising, in combination, an endless flexible belt having conveying elements on the interior surface thereof, said belt having a conveying section; means for driving the belt; article holding means for holding a quantity of articles to be conveyed on the conveying section of the belt, comprising a hopper defined by the interior surface of the bottom of the belt and a chute-shaped member opening into the bottom of the belt and extending sidewardly therefrom into which the parts to be elevated are deposited and a plurality of rollers forming a pair of roller assemblies, one on each side of and engaging the interior surface of the belt; means for supporting the belt and driving means, and means for removing the elevated articles from each conveying element in turn as each conveying element reaches a pre-selected point short of the upper end of the belt along a course of elevation.

5. A feeder machine for elevating articles comprising, in combination, an endless flexible belt having a conveying section and a hopper section, spaced conveying elements on the interior surface of said belt, means for driving said belt, and roller means engaging the edges of the interior surface of the bottom of the belt at the hopper section thereof for forming and maintaining the hopper section of the belt in a selected hopper shape for receiving articles to be conveyed on said conveying section.

6. A feeder machine for elevating articles comprising in combination, an endless flexible belt having a conveying section, forming means engaging the interior surface of said belt along both edges at substantially the bottom thereof for forming and maintaining the bottom of the belt as a hopper channeling said articles to the conveying section of said belt, means for driving said belt, and conveying elements on the interior surface of said belt extending transversely thereof and overlying substantially that portion of the width of said belt traveling between said forming means.

7. Apparatus in accordance with claim 6 including hopper sidewalls cooperating with said forming means and extending upwardly from said belt for channeling said articles onto the interior surface of said belt bottom.

8. Apparatus in accordance with claim 6 in which said forming means comprises a plurality of rollers engaging the interior surface of said belt along each edge for maintaining the bottom of the belt in a selected shape.

9. A feeder machine for elevating articles comprising, in combination, an endless flexible belt having a conveying section, forming means engaging the interior surface of said belt along both edges at substantially the bottom thereof for forming and maintaining the bottom of the belt as a hopper section channeling said articles to the conveying section of said belt, means for driving said belt, conveying strips of selected thickness on the interior surface of said belt extending transversely thereof and overlying substantially that portion of the width of said belt traveling between said forming means and means for supporting said belt conveying section at an acute angle to the hopper section of the belt sufficient to enable said conveying strips along the conveying section by gravity to elevate the articles to a selected point of discharge.

10. A feeder machine for elevating articles comprising, in combination, an endless flexible belt having a conveying section, forming means engaging the interior surface of said belt at substantially the bottom thereof for forming and maintaining the bottom of the belt as a hopper section channeling said articles to the conveying section of said belt, means for driving said belt, flexible conveying strips of selected thickness on the interior surface of said belt extending diagonally thereof at an angle sufficient to cause the articles being conveyed thereon to gravitate to a first edge of the conveying strips, said conveying strips overlying substantially that portion of the width of said belt traveling between said forming means, means for supporting said belt conveying section at an acute angle to said hopper section of the belt sufficient to enable said conveying strips along the conveying section by gravity to elevate the articles to a selected point of discharge and means preventing said articles from being discharged from the conveying strips at the first edge thereof while traveling along sad conveying section.

11. Apparatus in accordance with claim 10 including a filler bar substantially abutting the first edge of said conveying strips, said filler bar extending from said forming means to substantially the top of said conveying section.

References Cited in the file of this patent

UNITED STATES PATENTS

| 1,220,703 | Stoffel | Mar. 27, 1917 |
| 1,874,442 | Calloway | Aug. 30, 1932 |
| 2,054,247 | Dilger | Sept. 15, 1936 |
| 2,331,724 | Plant | Oct. 12, 1943 |
| 2,381,802 | Booth | Aug. 7, 1945 |
| 2,418,355 | Kirsch | Apr. 1, 1947 |
| 2,609,912 | Engel | Sept. 9, 1952 |

FOREIGN PATENTS

| 115,553 | Sweden | Dec. 18, 1945 |